(12) United States Patent
Acero Acero et al.

(10) Patent No.: US 11,617,235 B2
(45) Date of Patent: Mar. 28, 2023

(54) COOKING SYSTEM

(71) Applicant: BSH Hausgeräte GmbH, Munich (DE)

(72) Inventors: Jesus Acero Acero, Saragossa (ES);
Daniel Anton Falcon, Saragossa (ES);
Claudio Carretero Chamarro, Saragossa (ES); Pablo Jesus Hernandez Blasco, Saragossa (ES);
Sergio Llorente Gil, Saragossa (ES);
Ignacio Lope Moratilla, Saragossa (ES); Emilio Plumed Velilla, Saragossa (ES)

(73) Assignee: Munich, GERMANY, Munich (DE)

( * ) Notice: Subject to any disclaimer, the term of this patent is extended or adjusted under 35 U.S.C. 154(b) by 339 days.

(21) Appl. No.: 16/975,754

(22) PCT Filed: Feb. 18, 2019

(86) PCT No.: PCT/IB2019/051283
§ 371 (c)(1),
(2) Date: Aug. 26, 2020

(87) PCT Pub. No.: WO2019/166909
PCT Pub. Date: Sep. 6, 2019

(65) Prior Publication Data
US 2020/0404750 A1    Dec. 24, 2020

(30) Foreign Application Priority Data
Mar. 2, 2018  (ES) .............................. ES201830204

(51) Int. Cl.
*H05B 6/06* (2006.01)
*H05B 6/12* (2006.01)
(Continued)

(52) U.S. Cl.
CPC ............ *H05B 6/062* (2013.01); *A47J 27/004* (2013.01); *A47J 36/2483* (2013.01);
(Continued)

(58) Field of Classification Search
CPC ..... A47J 36/2483; A47J 27/004; H05B 6/062; H05B 6/1236; H05B 3/68; H05B 1/0266
See application file for complete search history.

(56) References Cited

U.S. PATENT DOCUMENTS

| | | |
|---|---|---|
| 2014/0158680 A1 | 6/2014 | Kataoka et al. |
| 2015/0264751 A1 | 9/2015 | Hazir et al. |

(Continued)

FOREIGN PATENT DOCUMENTS

JP    3363239 B2    1/2003

OTHER PUBLICATIONS

International Search Report PCT/IB2019/051283 dated May 31, 2019.
National Receipt Search Report ES20181025 dated Oct. 3, 2018.

*Primary Examiner* — Dana Ross
*Assistant Examiner* — Kuangyue Chen
(74) *Attorney, Agent, or Firm* — Michael E. Tschupp; Andre Pallapies; Brandon G. Braun

(57) ABSTRACT

A cooking system includes a placement unit which has a food-holding element and a heating unit for heating the food-holding element. An induction unit provides in at least one operating state an amount of heating energy for inductively heating the food-holding element. The heating unit includes a heating element which is different from an induction heating element and is provided for heating the food-holding element.

25 Claims, 4 Drawing Sheets

(51) Int. Cl.
*A47J 27/00* (2006.01)
*A47J 36/24* (2006.01)
*H05B 1/02* (2006.01)
*H05B 3/68* (2006.01)

(52) U.S. Cl.
CPC ......... *H05B 6/1236* (2013.01); *H05B 1/0266* (2013.01); *H05B 3/68* (2013.01)

(56) References Cited

U.S. PATENT DOCUMENTS

2016/0374154 A1* 12/2016 Viroli ...................... H02J 50/10
2018/0146517 A1   5/2018 Garcia Martinez et al.
2018/0263084 A1*  9/2018 Yoshino ................. H05B 6/062

* cited by examiner

COOKING SYSTEM

CROSS-REFERENCES TO RELATED APPLICATIONS

This application is the U.S. National Stage of International Application No. PCT/IB2019/051283, filed Feb. 18, 2019, which designated the United States and has been published as International Publication No. WO 2019/166909 A1 and which claims the priority of Spanish Patent Application, Serial No. P201830204, filed Mar. 2, 2018, pursuant to 35 U.S.C. 119(a)-(d).

BACKGROUND OF THE INVENTION

The invention relates to a cooking system and a method for an operation of a cooking system.

A cooking system comprising a placement unit which has a food-holding element and a heating unit is already disclosed in the international patent application WO 2016/185303 A1. The heating unit is integrated in a housing unit of the placement unit which is configured with the food-holding element in one piece. Additionally, a receiving unit is integrated in the housing unit, said receiving unit receiving a part of a heating energy provided by an induction unit and supplying the heating unit with a part of the received heating energy. The heating unit in this case is configured as an induction unit and is provided for inductively heating the food-holding element. In an operating state the food-holding element is exclusively inductively heated.

BRIEF SUMMARY OF THE INVENTION

The object of the invention is to provide, in particular, a generic system having improved properties with respect to efficiency.

The invention is based on a cooking system comprising at least one placement unit, which has at least one food-holding element and at least one heating unit for heating the food-holding element, and comprising at least one induction unit which, in at least one operating state, provides at least one amount of heating energy at least for inductively heating the food-holding element.

It is proposed that the heating unit has at least one heating element different from an induction heating element, which heating element is provided for heating the food-holding element.

By means of the embodiment according to the invention, in particular, a high level of efficiency may be achieved, in particular relative to a heat distribution, in particular in at least one base of the cooking vessel receiving element, and/or relative to a power distribution. In particular, a high power factor and/or active power factor may be achieved, whereby in particular a small current through an electronics module and/or a low electrical voltage applied to a resonance capacitance may be possible. In particular, low operating temperatures, in particular of the heating unit, and/or a small electrical current through an electronics module, in particular through a cooking electronics module, may be possible, whereby in particular an embodiment having a long service life may be achieved. In particular, a high level of flexibility and/or a high degree of freedom of design may be possible.

A "cooking system" is intended to be understood, in particular, as a system which has at least one cooking appliance which is provided for cooking food, such as for example an oven and/or a hob and/or a microwave, and which, in particular, could additionally have at least one further structural unit which is configured differently from a cooking appliance, such as in particular a cleaning appliance and/or a refrigerating appliance and/or a mobile appliance and/or at least one contact module. In particular, the cooking system is provided to have at least one structural unit which is provided for being arranged in a kitchen. The cooking system could have, for example, at least one accessory unit for the cooking appliance such as, for example, a sensor unit for the external measurement of a temperature of a cooking vessel and/or a food to be cooked and/or the placement unit and/or the food-holding element.

In particular, the cooking system has at least one placement plate which is provided, in particular, for placing the cooking vessel and/or the food-holding element. A "placement plate" is intended to be understood, in particular, as at least one, in particular plate-like, unit which is provided for placing at least one cooking vessel and/or for placing at least one food-holding element and/or for setting down at least one food to be cooked, for the purpose of heating. The placement plate could be configured, for example, as a partial region of at least one worktop, in particular of at least one kitchen worktop, in particular of the cooking system. Alternatively or additionally, the placement plate could be configured as a hob. The placement plate which is configured as a hob could form, in particular, at least one part of a hob external housing and, in particular together with at least one external housing unit to which the placement plate configured as a hob could be connected, in particular in at least one mounted state, could form the hob external housing at least to a large extent. The placement plate could, for example, be formed at least to a large extent from glass and/or from glass ceramic and/or from neolith and/or from Dekton and/or from wood and/or from marble and/or from stone, in particular, from natural stone and/or from laminate and/or from metal and/or from plastic and/or from ceramic. "At least to a large extent" is intended to be understood, in particular, as a proportion, in particular, a mass percentage and/or volume percentage, of at least 70%, in particular of at least 80%, advantageously of at least 90% and preferably of at least 95%.

A "placement unit" is intended to be understood, in particular, as a unit which is provided for a coupling to the heating unit and which, in particular, during the course of the coupling to the heating unit in at least one operating state receives and/or absorbs energy from the heating unit. For example, the food-holding element could be provided for placing on the placement plate. Alternatively or additionally, the placement unit could have, in particular in addition to the food-holding element, for example, at least one pad device, in particular of the food-holding element, which could be provided in particular for placing at least one cooking vessel and/or at least one food-holding element.

A "food-holding element" is intended to be understood, in particular, as an element which delimits and/or defines at least one receiving space which is provided for receiving at least one food to be cooked and which is provided, in particular, to be heated by the heating unit. In particular, the food-holding element consists at least to a large extent of at least one heatable material. For example, the food-holding element could be configured at least to a large extent from a metal, such as in particular aluminum and/or copper. The food-holding element has, in particular, a wall which at least partially surrounds the receiving space and which could be configured, in particular, at least to a large extent from the heatable material.

A "heating unit" is intended to be understood in this context, in particular, as a unit which is provided in at least one operating state to supply energy to at least one cooking vessel and/or at least one food-holding element for the purpose of heating the cooking vessel and/or the food-holding element. For example, the heating unit could be configured as a resistance heating unit and, in particular, provided to convert energy into heat and to supply this heat to the cooking vessel and/or the food-holding element for the purpose of heating the cooking vessel and/or the food-holding element. Alternatively or additionally, the heating unit could be configured as an induction heating unit and, in particular, provided to supply energy in the form of an electromagnetic alternating field to the cooking vessel and/or the food-holding element, wherein the energy supplied to the cooking vessel and/or the food-holding element, in particular, could be converted into heat in the cooking vessel and/or the food-holding element.

An "induction unit" is intended to be understood, in particular, as a unit which is provided in at least one operating state to provide at least one electromagnetic alternating field for transmitting energy and, in particular, to transmit the heating energy by means of the electromagnetic alternating field, in particular, inductively and advantageously wirelessly. The induction unit is provided, in particular, in at least one operating state to generate and/or to produce by means of the electromagnetic alternating field at least one induction current in the placement unit, in particular in the food-holding element of the placement unit and/or in the heating unit of the placement unit and/or in at least one receiving unit of the placement unit, and thus, in particular, to transmit the heating energy to the placement unit, in particular wirelessly.

The induction unit could have, for example, at least one energy transmission element which is configured differently from an induction heating element and which could be provided, in particular, in at least one operating state to provide the heating energy for the inductive heating of the food-holding element. In particular, the energy transmission element could have at least one inductor and/or at least one coil. The energy transmission element could be provided, in particular, in at least one operating state to provide the heating energy for the inductive heating of the food-holding element at least by means of an inductive energy transmission and namely, in particular, to at least one receiving unit of the placement unit. Alternatively or additionally, the induction unit could have at least one induction heating element which is provided, in particular, in at least one operating state to provide the heating energy for the inductive heating of the food-holding element. The induction unit could be provided, for example, in at least one operating state to generate and/or to produce by means of the electromagnetic alternating field at least one induction current in the food-holding element of the placement unit and to heat inductively the food-holding element, in particular directly and/or in a direct manner by the heating energy. The induction heating element of the induction unit could be configured, in particular, as a primary coil.

The expression that the induction unit in at least one operating state provides "at least" one heating energy at least for an inductive heating of the food-holding element is intended to be understood, in particular, as the induction unit in at least one operating state providing the heating energy for the inductive heating of the food-holding element and, in particular in addition to the heating energy for the inductive heating of the food-holding element, being able to provide at least one further energy which could be provided, in particular, for a further purpose. The further energy could be provided, for example, for supplying at least one electronics module. In particular, the induction unit in at least one operating state, in particular in addition to the heating energy for the inductive heating of the food-holding element, could provide at least one supply energy for supplying at least one electronics module. Alternatively or additionally, the further energy could be, in particular, a further heating energy which could be provided, in particular, for heating the food-holding element and which could be different from an inductive heating. In particular, the induction unit in at least one operating state, in particular in addition to the heating energy for the inductive heating of the food-holding element, could provide at least one further heating energy for supplying at least one heating element which is configured differently from an induction heating element. The further energy could alternatively or additionally, in particular, be at least one energy loss which, in particular, could be lost by means of dissipation during a transmission of the heating energy.

The expression that the induction unit in at least one operating state provides at least one heating energy "at least" for an inductive heating of the food-holding element is intended to be understood, in particular, as at least one part of the heating energy being provided for an inductive heating of the food-holding element and, in particular, additionally at least one further part of the heating energy being able to be provided for heating the food-holding element, which differs from an inductive heating of the food-holding element. The expression that the induction unit in at least one operating state "provides" at least one heating energy at least for an inductive heating of the food-holding element is intended to be understood, in particular, as the induction unit in at least one operating state heating the food-holding element with the heating energy, in particular directly and/or in a direct manner, and/or as the induction unit providing the heating energy to at least one further unit, such as for example to at least one receiving unit of the placement unit, which, in particular, subsequently inductively heats the food-holding element with at least one part of the received heating energy.

An "operating state" is intended to be understood, in particular, as a state in which the placement unit is placed on, in particular, the placement plate and advantageously on at least one reference placement position defined by the placement plate and in which the induction unit, in particular, supplies the heating energy to the placement unit in particular directly and/or indirectly.

An "induction heating element" is intended to be understood in this context, in particular, as an element which is provided to generate an electromagnetic alternating field, in particular at a frequency of 20 kHz to 100 kHz, which is provided, in particular in at least one, in particular metal, preferably ferromagnetic, base, in particular, of the food-holding element, to be converted into heat by eddy current induction and/or magnetic reversal effects. A "heating element which is configured differently from the induction heating element" is intended to be understood, in particular, as an electric element which in at least one operating state provides at least one heating energy which is different from an inductive heating energy for heating the food-holding element. The heating element which is configured differently from the induction heating element could, for example, be a radiation heating element and, in particular, heat the food-holding element in at least one operating state by means of electromagnetic radiation, for example by means of infrared radiation. Alternatively or additionally, the heating element which is configured differently from the induction heating element could, for example, be a resistance heating element and, in particular, heat the food-holding element in at least one operating state by means of a heating energy, which the heating element provides, in particular, by converting an electrical energy provided by the heating element into thermal energy.

"Provided" is intended to be understood, in particular, as specifically programmed, designed and/or equipped. An object being provided for a specific function is intended to be understood, in particular, as the object fulfilling and/or performing this specific function in at least one use state and/or operating state.

For example, the induction unit, in particular the induction heating element of the induction unit, in at least one operating state could heat the food-holding element in a direct manner and/or directly, by means of at least one part of the heating energy for the inductive heating of the food-holding element, and transmit, in particular, at least one part of the heating energy in a direct manner and/or directly to the food-holding element. Preferably, the placement unit has at least one receiving unit which is provided for wirelessly receiving at least one part of the heating energy and for supplying the heating element with at least one part of the received energy. In particular, the induction unit, in particular the induction heating element, is provided in at least one operating state to heat the food-holding element in an indirect manner and/or indirectly, by means of at least one part of the heating energy for the inductive heating of the food-holding element, and to transmit, in particular, at least one part of the heating energy in an indirect manner and/or indirectly to the food-holding element. The induction unit, in particular the induction heating element, is provided, in particular, in at least one operating state to transmit at least one part of the heating energy to the receiving unit and, in particular, to heat the food-holding element in an indirect manner and/or indirectly via the receiving unit. The receiving unit could have, in particular, at least one coil and/or at least one inductor and/or at least one induction heating element. As a result, in particular, an optimal heating of the food-holding element may be permitted. In particular, a high level of flexibility may be achieved since, in particular, cabling may be dispensed with.

The heating unit could, for example, exclusively have the heating element which is configured differently from the induction heating element and, in particular, be without induction heating elements. Preferably, the heating unit in addition to the heating element has at least one induction heating element which, in at least one operating state, inductively heats the food-holding element with at least one part of the received energy. As a result, in particular, a particularly high level of efficiency and/or a high level of flexibility and/or a uniform heating of the food-holding element may be achieved since the food-holding element, in particular, may be heated both inductively and in a manner which is different from an inductive heating.

For example, the receiving unit could be configured differently from the induction heating element and, in particular, in at least one operating state could be provided for supplying the induction heating element with at least one part of the received energy. Preferably, the induction heating element is at least partially part of the receiving unit. The receiving unit and the induction heating element of the heating unit are, in particular, configured in one piece. The induction heating element of the heating unit could be configured, in particular, as a repeater coil and, in particular, provided to receive energy and/or at least one electromagnetic alternating field from the induction heating element of the induction unit configured as a primary coil. The expression that a first object is "at least partially" part of a second object is intended to be understood, in particular, as the first object having at least one partial region, in particular at least one element and/or at least one unit, which is part of the second object and, in particular, in addition to the partial region being able to have at least one further partial region which, in particular, could be part of at least one third object which is different from the second object. As a result, in particular, less storage and/or a reduced number of different components may be achieved. By the coupling of the induction unit and the receiving unit, in particular the induction heating element being at least partially part thereof, losses may be distributed, in particular, to the two structural units, whereby in particular a low temperature of the induction unit may be achieved. In particular, losses of the receiving unit may be used for heating the food-holding element.

If the receiving unit and/or the induction heating element, when viewed perpendicular to a main extension plane of the induction heating element, has the same surface extent as the food-holding element, in particular an optimized power distribution may be achieved and namely, in particular, irrespective of a surface extent of the induction unit.

In the case of, in particular, a conventional heating of the food-holding element which is known, in particular, from the prior art, in which an induction heating element of the induction unit heats the food-holding element, in particular in a direct manner and/or directly, generally when viewed perpendicular to a main extension plane of the induction unit, an inner partial region and an outer partial region of the food-holding element is less well-heated than an annular partial region located therebetween. The heating element, when viewed perpendicular to a main extension plane of the induction unit, may be arranged in at least one operating state, in particular, at least partially in the inner partial region and/or at least partially in the outer partial region, whereby, in particular, a particularly uniform heating of the food-holding element may be permitted.

It is further proposed that the induction heating element and the heating element are electrically connected in series, whereby in particular a simple and/or cost-effective and/or uncomplicated embodiment may be achieved.

It is additionally proposed that the placement unit has at least one resonance capacitance which is electrically conductively connected to the induction heating element. In particular, the induction heating element and the resonance capacitance are electrically connected in series. The resonance capacitance has, in particular at least one capacitor. For example, the resonance capacitance could have at least two, in particular at least three, advantageously at least four and preferably a plurality of capacitances which, in particular, could be arranged in any series circuit and/or parallel circuit in particular. Advantageously, the resonance capacitance has just one capacitor and, in particular, consists of the capacitor. As a result, the induction heating element, in particular, may be operated at its resonance frequency, whereby in particular a high level of efficiency and/or small losses may be permitted. In particular, a low voltage in the resonance capacitance may be permitted.

For example, the induction heating element and the heating element, when viewed perpendicular to a main extension plane of the induction heating element and/or when viewed perpendicular to a main extension plane of a placement plate, could have at least substantially the same shape and/or design and/or size and/or surface extent and, in particular, be arranged so as to overlap and/or be congruent. Preferably, when viewed perpendicular to a main extension plane of the induction heating element and/or when viewed perpendicular to a main extension plane of a placement plate, the induction heating element, in particular at least one part of the induction heating element, surrounds at least one part of the heating element. For example, when viewed perpendicular to a main extension plane of the induction heating element and/or when viewed perpendicular to a main extension plane of a placement plate, the induction heating element could surround the, in particular, entire heating element. In particular, when viewed perpendicular to a main extension plane of the induction heating element and/or when viewed perpendicular to a main extension plane of a placement plate, the part of the heating element which is surrounded, in particular, by the induction heating element is arranged at least substantially around a central point and/or point of gravity of the induction heating element. As a result, in particular, an inner region of the induction heating element which, in particular, due to the absence of the heating element would be heated only slightly, is able to be optimally heated. In particular, the induction heating element and the heating element may optimally complement one another for heating the food-holding element, whereby in particular an optimal heating and/or optimal cooking results may be achieved.

For example, when viewed perpendicular to a main extension plane of the induction heating element and/or when viewed perpendicular to a main extension plane of a placement plate, the, in particular, entire induction heating element could surround the, in particular, entire heating element. The, in particular, entire induction heating element, for example, could be arranged concentrically around the, in particular, entire heating element. Preferably, when viewed perpendicular to a main extension plane of the induction heating element and/or when viewed perpendicular to a main extension plane of a placement plate, the heating element, in particular at least one part of the heating element, surrounds at least one part of the induction heating element and, in particular, in addition to the part of the heating element surrounded by the induction heating element. As a result, in particular, a high level of flexibility and/or a high degree of freedom of design may be achieved.

When viewed perpendicular to a main extension plane of the induction unit and/or when viewed perpendicular to a main extension plane of a placement plate, the induction unit and the induction heating element could have in at least one operating state, in particular, the same surface extent and/or be arranged, in particular, so as to overlap. Alternatively or additionally, when viewed perpendicular to a main extension plane of the induction unit and/or when viewed perpendicular to a main extension plane of a placement plate, the induction heating element could be arranged within a surface spanned by the induction unit. Preferably, when viewed perpendicular to a main extension plane of the induction unit and/or when viewed perpendicular to a main extension plane of a placement plate, the induction unit is arranged in at least one operating state within a surface spanned by the induction heating element. When viewed perpendicular to a main extension plane of the induction unit and/or when viewed perpendicular to a main extension plane of a placement plate, the induction unit, in particular, has a smaller surface extent than the induction heating element. As a result, in particular, a particularly high level of efficiency may be achieved and namely, in particular, relative to an energy transmission between the induction unit and the induction heating element.

It is further proposed that in at least one operating state the food-holding element and the induction unit have a spacing of at least 10 mm, in particular of at least 15 mm, advantageously of at least 20 mm, particularly advantageously of at least 25 mm and preferably of at least 30 mm. In particular, the food-holding element and the induction unit in at least one operating state have a spacing of a maximum of 500 mm, in particular a maximum of 250 mm, advantageously a maximum of 100 mm, particularly advantageously a maximum of 80 mm and preferably a maximum of 60 mm. The placement plate in at least one operating state is arranged, in particular, between the induction unit and the placement unit. As a result, in particular, an optimal heating of the food-holding element may be permitted even over large distances. In particular, an arrangement of the placement plate between the induction unit and the placement unit may be permitted and namely, in particular, at the same time with a high level of flexibility in terms of configuring a thickness and thus, in particular, a material of the placement plate.

It is further proposed that the placement unit has at least one housing unit in which the heating unit and, in particular, the receiving unit is at least partially integrated. The expression that a first object is integrated "at least partially" in a second object is intended to be understood, in particular, as the first object having at least one partial region, in particular at least one element and/or at least one unit, which is integrated in the second object and, in particular, in addition to the partial region being able to have at least one further partial region which, in particular, could be integrated in at least one third object which is different from the second object. The expression that a first object is "integrated" in a second object is intended to be understood, in particular, as the first object being arranged inside the second object and, in particular, being surrounded by the second object. The housing unit defines, in particular, an outer boundary and/or wall of the placement unit which, in particular, may be grasped by a user and/or is arranged to be accessible and/or visible thereto. In particular, the housing unit is configured as an outer housing unit. As a result, in particular, a protected arrangement of the heating unit and/or the receiving unit may be permitted, whereby in particular an embodiment having a long service life may be achieved.

It is additionally proposed that the housing unit and the food-holding element are configured in one piece. "In one piece" is intended to be understood, in particular, as at least connected by a material connection, for example by a welding process, a bonding process, an injection-molding process and/or a further process which appears expedient to the person skilled in the art and/or advantageously formed in a single piece, such as for example by producing from a casting and/or by producing in a single-component or multi-component injection-molding method and advantageously from a single blank. As a result, in particular, a high level of stability and/or a reduced number of different components may be achieved.

The heating unit and, in particular, the receiving unit could, for example, be exclusively and/or fully integrated in the housing unit. In particular, the placement unit could have at least one pad device which, in particular, could be provided for placing the food-holding element and/or the housing unit and which, in particular, could be free from the heating unit and/or the receiving unit. Preferably, the placement unit has at least one pad device which is provided for placing the food-holding element and in which the heating unit is at least partially integrated. The heating unit and, in particular, the receiving unit could, for example, be integrated at least partially in the housing unit and at least partially in the pad device. Alternatively, the heating unit and, in particular, the receiving unit could, for example, be exclusively and/or fully integrated in the pad device. A "pad device" is intended to be understood, in particular, as a device which, in particular, is provided for setting down, in particular for positioning, on the placement plate and for placing the food-holding element and/or the housing unit and which, in particular, in at least one operating state at least partially forms a pad for the food-holding element and/or for the housing unit. In an installed position, the pad device is provided, in particular, for positioning above the heating unit. In particular, the pad device is provided to absorb at least a thermal energy originating from the placed food-holding element and/or from the placed housing unit and/or to prevent it from reaching the placement plate. As a result, in particular, an embodiment having a long service life may be achieved since, in particular, a protected arrangement of the heating unit and/or the receiving unit is permitted and/or, in particular, damage to the placement plate which, in particular, could be produced by heating the food-holding element and/or the housing unit, is avoided.

A particularly high level of efficiency may be achieved, in particular, by a placement unit of a cooking system.

An efficiency may be further increased, in particular, by a method for operating a cooking system in which a food-holding element is inductively heated, wherein the food-holding element is heated in addition to the inductive heating in at least a manner which is different from an inductive heating and namely, in particular, by means of electromagnetic radiation and/or by means of heat radiation.

The cooking system is not intended to be limited herein to the above-described use and embodiment. In particular, for fulfilling a mode of operation described herein the cooking system may have a number of individual elements, components and units which is different from a number cited herein.

Further advantages are disclosed from the following description of the drawings. Exemplary embodiments of the invention are shown in the drawings. The drawings, the description and the claims contain numerous features in combination. The person skilled in the art will also expediently consider the features individually and combine them to form further meaningful combinations.

DETAILED DESCRIPTION OF EXEMPLARY EMBODIMENTS OF THE PRESENT INVENTION

Figure 1:
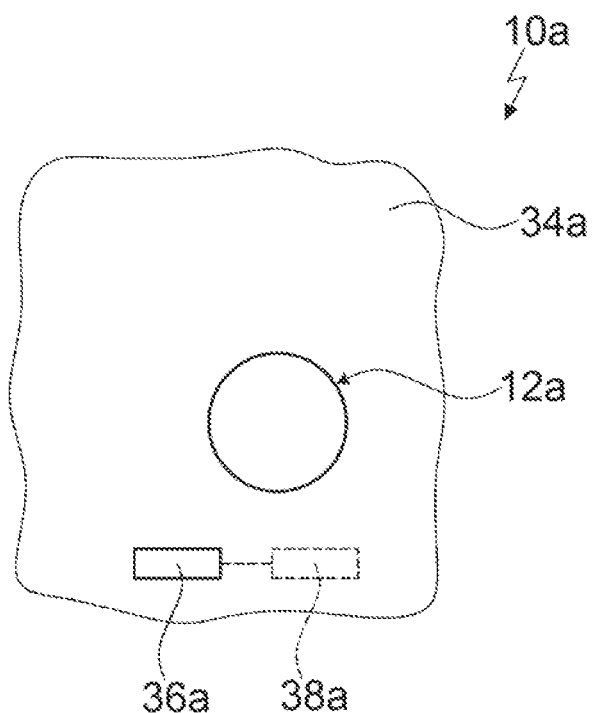
FIG. 1 shows a cooking system in a schematic plan view.

FIG. 1 shows a cooking system 10a which is configured as an induction cooking system. The cooking system 10a in the present exemplary embodiment is configured as a hob system and, in particular, as an induction hob system.

The cooking system 10a has a placement plate 34a. The placement plate 34a defines a reference placement position for a placement unit 12a (see also FIG. 2). In a mounted state the placement plate 34a forms a visible surface which in a mounted state, in particular, is arranged facing a user. The placement plate 34a is provided for placing the placement unit 12a, in particular, on the reference placement position for heating (see FIGS. 1 and 2). In the present exemplary embodiment, the placement plate 34a is configured as a worktop, in particular as a kitchen worktop.

The cooking system 10a has a user interface 36a for inputting and/or selecting operating parameters, for example a heating power and/or a heating power density and/or a heating zone. The user interface 36a is provided for outputting a value of an operating parameter to a user.

The cooking system 10a has a control unit 38a. The control unit 38a is provided to perform actions and/or to alter settings as a function of operating parameters which are input by means of the user interface 36a. In a heating operating state the control unit 38a regulates an energy supply to at least one appliance heating element 40a.

Figure 2:
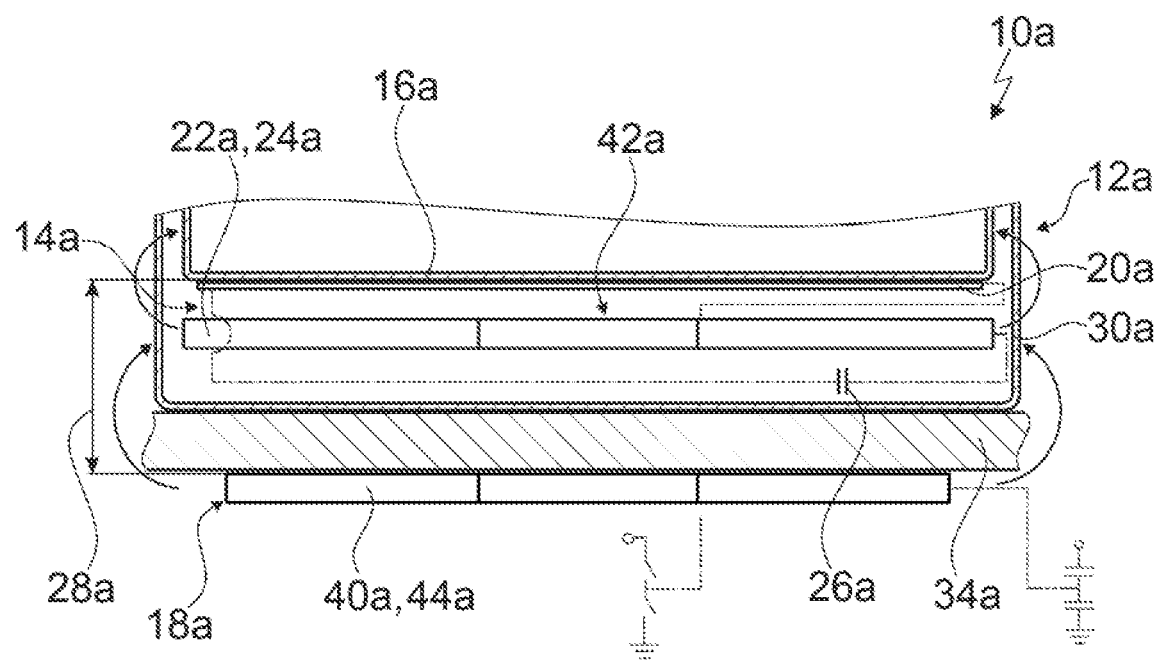
FIG. 2 shows a section along the line II-II in FIG. 1 in a schematic view, wherein electrical connections are shown in dashed lines and an energy transmission is shown using arrows.

The cooking system 10a has at least one appliance heating element 40a (see FIGS. 1 and 2). In the present exemplary embodiment, the cooking system 10a has a plurality of appliance heating elements 40a, in the figures only one thereof being shown and only one thereof being described hereinafter. The appliance heating element 40a is provided to heat at least one placement unit 12a placed on the placement plate 34a above the appliance heating element 40a and, in particular, at the reference placement position. The appliance heating element 40a is configured as an induction heating element. The appliance heating element 40a is arranged in an installed position below the placement plate 34a and namely, in particular, below the reference placement position.

Figure 3:
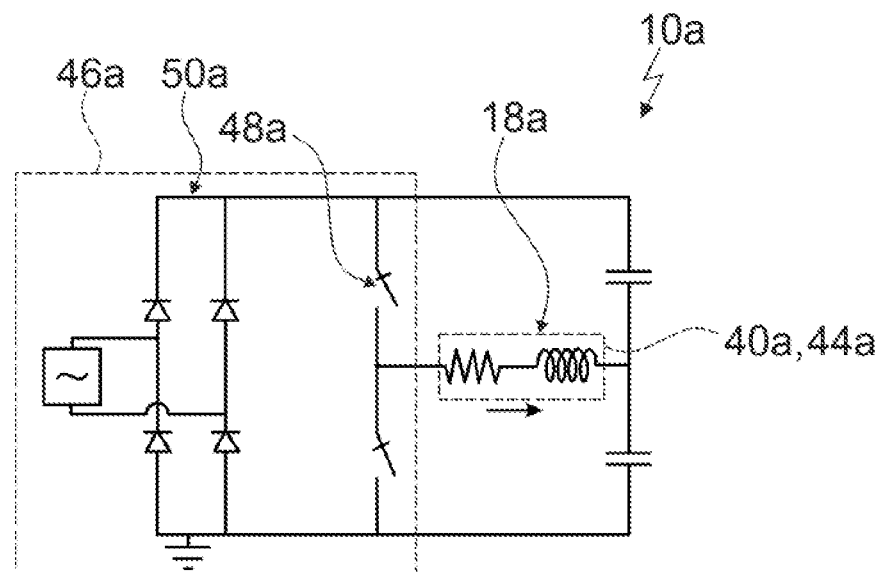
FIG. 3 shows an electrical circuit of a supply unit and an induction unit of the cooking system, an appliance heating element of the cooking system being part thereof, in a schematic view.

The cooking system 10a has a supply unit 46a which is provided for supplying the appliance heating element 40a with energy (see FIG. 3). The supply unit 46a is constructed in the conventional manner. The supply unit 46a has an inverter 48a. In an operating state the inverter 48a provides a high-frequency alternating current for supplying the appliance heating element 40a. The supply unit 46a has a rectifier 50a. In an operating state the rectifier 50a rectifies a voltage. The rectifier 50a and the inverter 48a are electrically conductively connected together.

The cooking system 10a has the placement unit 12a (see FIGS. 1 and 2). The placement unit 12a has a food-holding element 16a. The food-holding element 16a is provided for receiving food for the purpose of heating the food. The food-holding element 16a to a large extent consists of a metallic and, in particular ferromagnetic, material. The placement unit 12a is provided specifically for the cooking system 10a.

The placement unit 12a has a heating unit 14a. The heating unit 14a is provided for heating the food-holding element 16a. In an operating state the heating unit 14a supplies energy to the food-holding element 16a for heating the food-holding element 16a.

In the present exemplary embodiment the placement unit 12a has a housing unit 30a (see FIG. 2). The housing unit 30a is configured as an external housing unit. The housing unit 30a and the food-holding element 16a are configured in one piece.

The housing unit 30a and the food-holding element 16a define and/or enclose together an interior 42a. In an operating state the heating unit 14a is arranged in the interior 42a. In an operating state the heating unit 14a is partially integrated in the housing unit 30a.

For supplying heating energy to the heating unit 14a the cooking system 10a has an induction unit 18a. In an installed position the induction unit 18a is arranged below the placement plate 34a, and namely, in particular, below the reference placement position. The appliance heating element 40a is partially part of the induction unit 18a.

In an operating state the induction unit 18a provides a heating energy at least for an inductive heating of the food-holding element 16a. The induction unit 18a provides the heating energy for the inductive heating of the food-holding element 16a in the form of an electromagnetic alternating field. The induction unit 18a has an inductor 44a. In an operating state the inductor 44a provides the heating energy at least for an inductive heating of the food-holding element 16a. The inductor 44a and the appliance heating element 40a are configured in one piece.

For example, the induction unit 18a could supply the heating energy directly and/or in a direct manner to the food-holding element 16a. In the present exemplary embodiment, the induction unit 18a supplies the heating energy to the appliance heating element 40a indirectly and/or in an indirect manner and namely, in particular, via the heating unit 14a of the placement unit 12a.

Figure 4:
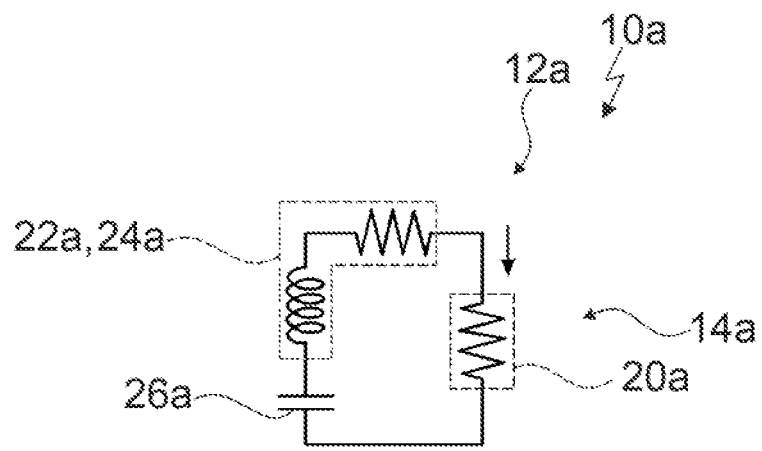
FIG. 4 shows an electrical circuit of a heating element of a heating unit of the cooking system and a receiving unit of the cooking system, an induction heating element of the heating unit being part thereof, in a schematic view.
Figure 5:
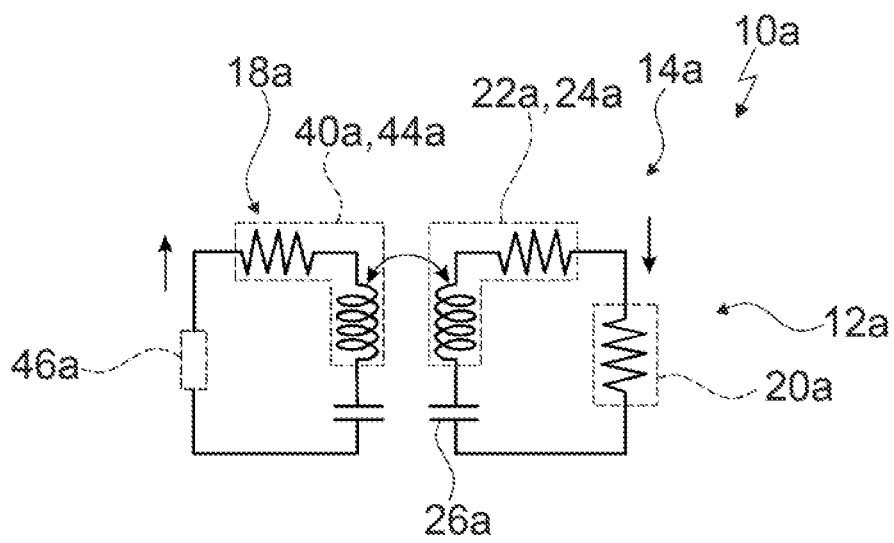
FIG. 5 shows a detail of a coupling of the electrical circuits of FIGS. 3 and 4 in a schematic view.
Figure 6:
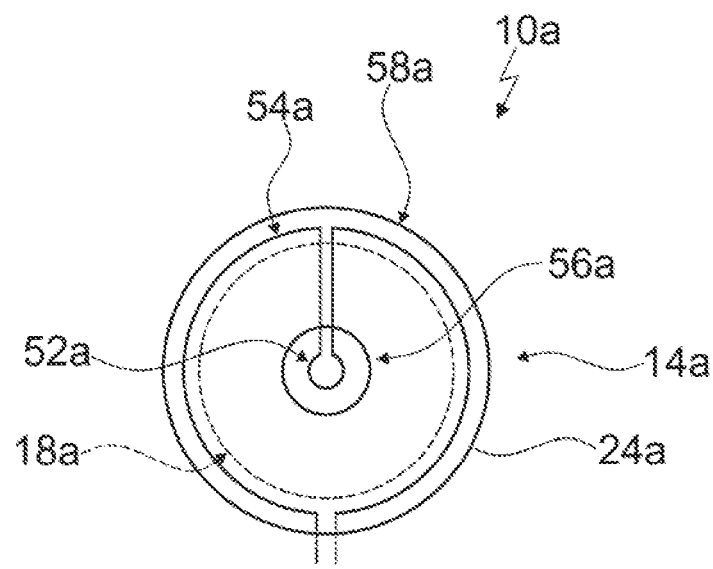
FIG. 6 shows a plan view of a main extension plane of the induction heating element in a schematic view, wherein for the sake of simplicity a view of a housing unit of a placement unit of the cooking system and a placement plate of the cooking system has been dispensed with, FIG. 7 shows a diagram in which a power factor is plotted over a frequency.

The heating unit 14a has a heating element 20a which is configured differently from an induction heating element (see FIGS. 2, 4 and 5). In the present exemplary embodiment, the heating element 20a is configured as a resistance heating element. The heating element 20a is provided for heating the food-holding element 16a.

The placement unit 12a has a receiving unit 22a (see FIGS. 2, 4, and 5). The receiving unit 22a is provided for wirelessly receiving at least one part of the heating energy. The receiving unit 22a has an induction heating element 24a which in an operating state wirelessly receives the part of the heating energy from the receiving unit 22a. The induction unit 18a is provided for transmitting inductive energy to the receiving unit 22a. In an operating state the induction unit 18a transmits the heating energy inductively to the receiving unit 22a.

The receiving unit 22a is provided for supplying the heating element 20a with at least one part of the received energy. The receiving unit 22a and the heating element 20a are electrically conductively connected together. In the present exemplary embodiment, the receiving unit 22a and the heating element 20a are electrically connected in series.

In addition to the heating element 20a, the heating unit 14a has an induction heating element 24a (see FIGS. 2, 4 and 5). The induction heating element 24a is partially part of the receiving unit 22a. The induction heating element 24a of the heating unit 14 and the induction heating element 24a of the receiving unit 22a are identical. In an operating state the induction heating element 24a inductively heats the food-holding element 16a with at least one part of the energy received from the receiving unit 22a.

The induction heating element 24a and the heating element 20a are electrically connected in series (see FIGS. 2, 4 and 5). The placement unit 12a has a resonance capacitance 26a. The resonance capacitance 26a has in the present exemplary embodiment a capacitor and is configured, in particular, as the capacitor. In an operating state, the resonance capacitance 26a is electrically conductively connected to the induction heating element 24a.

When viewed on a main extension plane of the induction heating element 24a, the induction heating element 24a surrounds a part 52a of the heating element 20a and namely, in particular, an inner part 52a of the heating element 20a. In addition to the inner part 52a of the heating element 20a, the heating element 20a has an outer part 54a. When viewed on a main extension plane of the induction heating element 24a, the heating element 20a and namely, in particular, the outer part 54a of the heating element 20a, surrounds a part of the induction heating element 24a and namely, in particular, an inner part 56a of the induction heating element 24a.

In addition to the inner part 56a of the induction heating element 24a the induction heating element 24a has an outer part 58a. When viewed on a main extension plane of the induction heating element 24a, the induction heating element 24a, and namely, in particular, the outer part 58a of the induction heating element 24a, surrounds a part 52a, 54a of the heating element 20a, and namely, in particular, the inner part 52a of the heating element 20a and the outer part 54a of the heating element 20a.

When viewed on a main extension plane of the induction heating element 24a, the induction heating element 24a surrounds the induction unit 18a. When viewed perpendicular to a main extension plane of the induction unit 18a, the induction unit 18a is arranged in an operating state within a surface spanned by the induction heating element 24a. When viewed on a main extension plane of the induction heating element 24a, the induction heating element 24a has a surface extent which is larger than a surface extent of the induction unit 18a.

In an operating state the food-holding element 16a and the induction unit 18a are arranged spaced apart from one another. In the present exemplary embodiment, in an operating state the food-holding element 16a and the induction unit 18a have a spacing 28a of substantially 34 mm (see FIG. 2).

In a method for an operation of the cooking system 10a, the food-holding element 16a is heated in addition to the inductive heating at least in a manner which is different from an inductive heating. In an operating state in addition to the inductive heating, in particular by means of the induction heating element 24a, the food-holding element 16a is heated by the heating element 20a which, in particular, is a resistance heating element.

Figure 7:
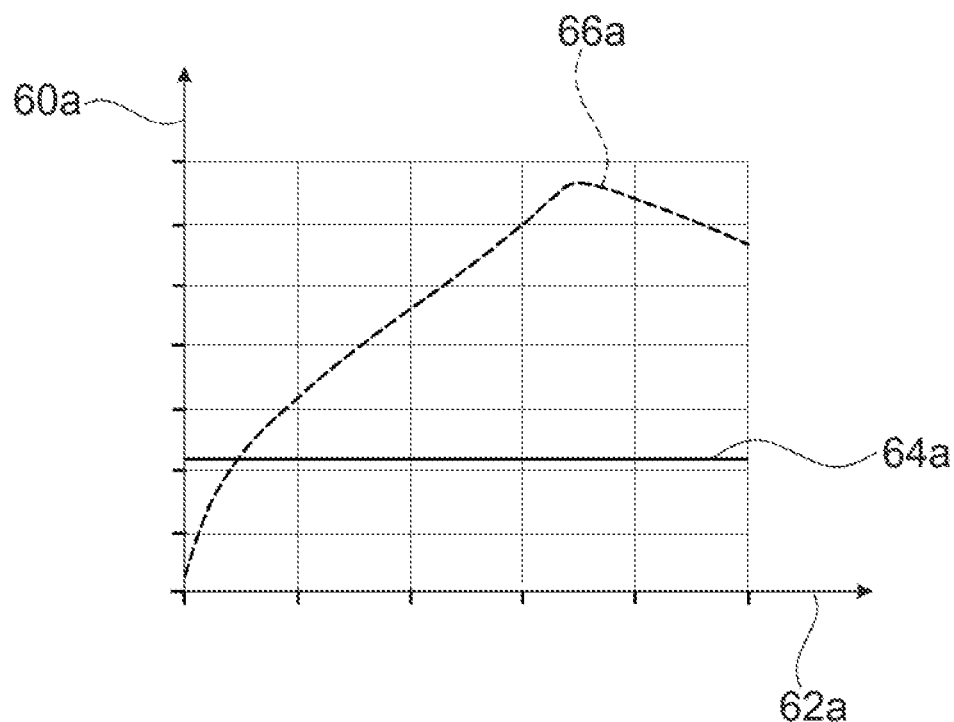

FIG. 7 shows a diagram in which a power factor is plotted over a power. The power factor is plotted on a y-axis 60a. A power is plotted on an x-axis 62a. A curve 64a shown in solid lines shows a path of the power factor over the power for an embodiment in which a food-holding element is directly heated by the appliance heating element 40a, and namely, in particular, by avoiding a heating unit 14a integrated in the placement unit 12a. A curve 66a shown in dashed lines shows a path of the power factor over the power for an embodiment in which the food-holding element 16a is heated by the heating unit 14a integrated in the placement unit 12a.

It may be identified that in a large part of the frequency range in the case of heating the food-holding element 16a by means of the heating unit 14a integrated in the placement unit 12a a higher power factor may be achieved than in the case of heating the food-holding element 16a exclusively by means of the appliance heating element 40a and namely, in particular, due to a coupling of the induction unit 18a and the receiving unit 22a.

Due to a similarity of the circuit in which the induction unit 18a is arranged and the circuit in which the heating unit 14a and/or the receiving unit 22a is arranged, in particular it may be achieved that a total impedance is independent of a number of windings of the induction heating element 24a of the heating unit 14a. As a result, in particular, a high degree of freedom of design may be permitted and namely, in particular, relative to an embodiment and/or arrangement of the induction heating element 24a of the heating unit 14a and/or the resonance capacitance 26a. In particular, an electrical current and an electrical voltage in the circuit in which the heating unit 14a and/or the receiving unit 22a is arranged may be freely selected, such as for example a high voltage and a small current or a low voltage and a large current or any intermediate values thereof.

Figure 8:
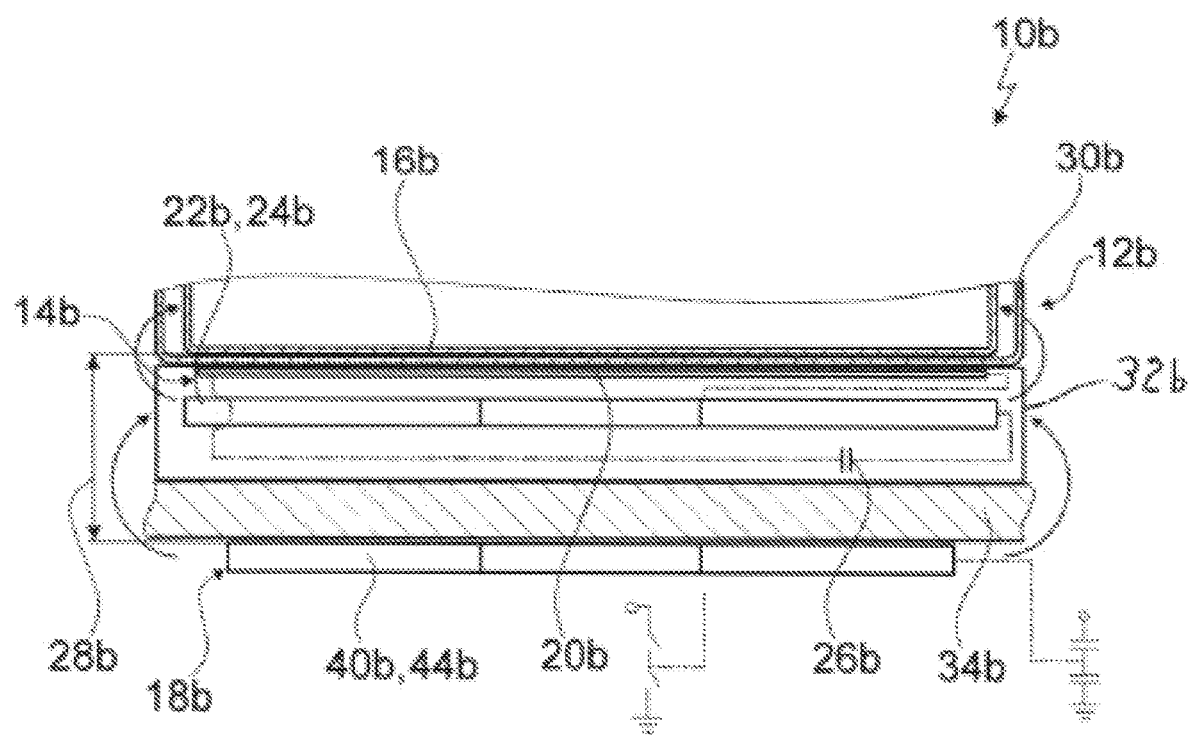
FIG. 8 shows a detail of an alternative cooking system in a schematic sectional view.
Figure 9:
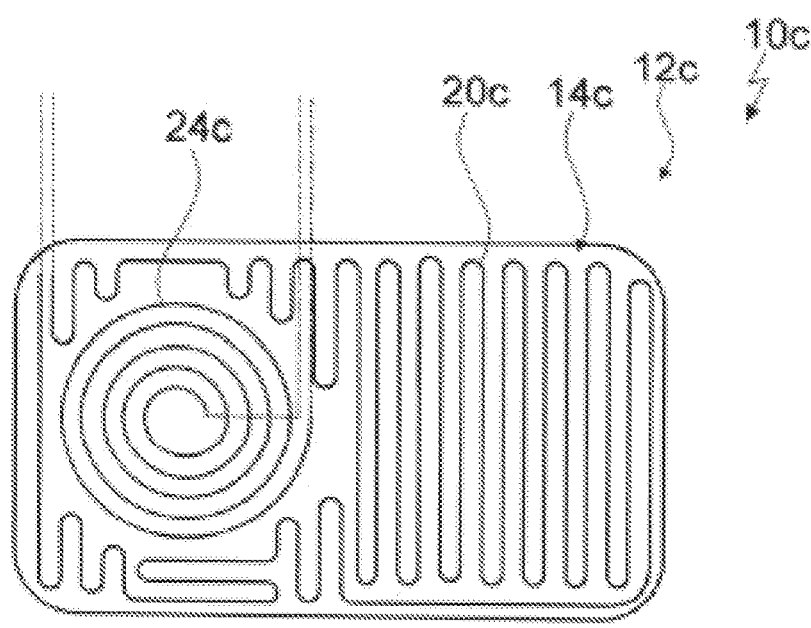
FIG. 9 shows a heating unit of a placement unit of an alternative cooking system in a schematic plan view.

In FIGS. 8 and 9 two further exemplary embodiments of the invention are shown. The following descriptions are substantially limited to the differences between the exemplary embodiments, wherein relative to components, features and functions remaining the same reference may be made to the description of the exemplary embodiment of FIGS. 1 to 7. For differentiating between the exemplary embodiments the letter a in the reference numerals of the exemplary embodiment in FIGS. 1 to 7 is replaced by the letters b and c in the reference numerals of the exemplary embodiment of FIGS. 8 (18b, 20b, 24b, 26b, 28b, 34b, 40b, 44b) and 9. Relative to components denoted the same, in particular relative to components with the same reference numerals, in principle reference may also be made to the drawings and/or the description of the exemplary embodiment of FIGS. 1 to 7.

FIG. 8 shows a detail of an alternative cooking system 10b which has a placement unit 12b. The placement unit 12b has a heating unit 14b and a food-holding element 16b. The placement unit 12b has a housing unit 30b. The housing unit 30b and the food-holding element 16a are configured in one piece.

In addition to the housing unit 30b the placement unit 12b has a pad device 32b. The pad device 32b is provided for placing the food-holding element 16b and, in particular, in addition to placing the housing unit 30b. In an operating state the heating unit 14b is partially integrated in the pad device 32b. In an operating state a receiving unit 22b of the placement unit 12b is partially integrated in the pad device 32b.

FIG. 9 shows a plan view of a heating unit 14c of a placement unit 12c of an alternative cooking system 10c. The heating unit 14c has a heating element 20c which is configured differently from an induction heating element. The heating unit 14c has an induction heating element 24c which is connected in series with the heating element 20c. When viewed perpendicular to a main extension plane of the induction heating element 24c, the heating element 20c surrounds the induction heating element 24c. When viewed perpendicular to a main extension plane of the induction heating element 24c, the heating element 20c extends substantially over an entire surface extent of the placement unit 12c. When viewed perpendicular to a main extension plane of the induction heating element 24c, in the present exemplary embodiment the placement unit 12c has a substantially elongated and/or rectangular design.

The invention claimed is:

1. A cooking system, comprising:
a placement unit including a food-holding element and a heating unit for heating the food-holding element, the heating unit being located in a housing unit that is outside of the food-holding element; and
an induction unit configured to provide in at least one operating state an amount of heating energy for inductively heating the food-holding element,
wherein the heating unit includes a heating element that heats by other than induction heating and is provided for heating the food-holding element.

2. The cooking system of claim 1, wherein the placement unit includes a receiving unit configured to wirelessly receive at least part of the heating energy and to supply the heating element with at least part of the received heating energy.

3. The cooking system of claim 2, wherein the heating unit includes an induction heating element configured to inductively heat the food-holding element in at least one operating state with at least one part of the received heating energy.

4. The cooking system of claim 3, wherein the induction heating element is at least partially part of the receiving unit.

5. The cooking system of claim 3, wherein the induction heating element and the heating element are electrically connected in series.

6. The cooking system of claim 3, wherein the placement unit includes a resonance capacitance configured to electrically conductively connect to the induction heating element.

7. The cooking system of claim 3, wherein, when viewed in a direction perpendicular to a main extension plane of the induction heating element, the induction heating element surrounds at least one part of the heating element.

8. The cooking system of claim 3, wherein, when viewed in a direction perpendicular to a main extension plane of the induction heating element, the heating element surrounds at least one part of the induction heating element.

9. The cooking system of claim 3, wherein, when viewed in a direction perpendicular to a main extension plane of the induction unit, the induction unit is arranged in at least one operating state within a surface spanned by the induction heating element.

10. The cooking system of claim 1, wherein in at least one operating state the food-holding element and the induction unit have a spacing of at least 10 mm.

11. The cooking system of claim 1, wherein the housing unit and the food-holding element are configured in one piece.

12. The cooking system of claim 1, wherein the placement unit includes a pad device which is provided for placing the food-holding element and in which the heating unit is at least partially integrated.

13. A placement unit of a cooking system, said placement unit comprising:
a food-holding element; and
a heating unit including a heating element that heats by other than induction heating and is provided for heating the food-holding element, the heating unit being located in a housing unit that is outside of the food-holding element.

14. The placement unit of claim 13, further comprising a receiving unit configured to wirelessly receive at least part of a heating energy generated by an induction unit of the cooking system and to supply the heating element with at least part of the received heating energy.

15. The placement unit of claim 14, wherein the heating unit includes an induction heating element configured to inductively heat the food-holding element in at least one operating state with at least one part of the received heating energy.

16. The placement unit of claim 15, wherein the induction heating element is at least partially part of the receiving unit.

17. The placement unit of claim 15, wherein the induction heating element and the heating element are electrically connected in series.

18. The placement unit of claim 15, further comprising a resonance capacitance configured to electrically conductively connect to the induction heating element.

19. The placement unit of claim 15, wherein, when viewed in a direction perpendicular to a main extension plane of the induction heating element, the induction heating element surrounds at least one part of the heating element.

20. The placement unit of claim 15, wherein, when viewed in a direction perpendicular to a main extension plane of the induction heating element, the heating element surrounds at least one part of the induction heating element.

21. The placement unit of claim 15, wherein the induction heating element spans a surface within which the induction unit is arranged in at least one operating state, when viewed in a direction perpendicular to a main extension plane of the induction unit.

22. The placement unit of claim 14, wherein in at least one operating state the food-holding element is spaced from the induction unit by a spacing of at least 10 mm.

23. The placement unit of claim 13, wherein the housing unit and the food-holding element are configured in one piece.

24. The placement unit of claim 13, further comprising a pad device which is provided for placing the food-holding element and in which the heating unit is at least partially integrated.

25. A method for operation of a cooking system, said method comprising:
- inductively heating a food-holding element of the cooking system; and
- heating the food-holding element in addition to the inductively heating in a manner which is different from the inductively heating,
- wherein the inductively heating and the manner which is different from the inductively heating are performed by a heating unit that is located in a housing unit, and
- the housing unit is located outside of the food-holding element.

* * * * *